United States Patent [19]

Martini

[11] 3,725,485
[45] Apr. 3, 1973

[54] SEPARATION OF META AND PARA-CRESOL
[75] Inventor: Joseph C. Martini, Houston, Tex.
[73] Assignee: Gulf Research & Development Company, Pittsburgh, Pa.
[22] Filed: Nov. 12, 1970
[21] Appl. No.: 89,123

Related U.S. Application Data

[60] Division of Ser. No. 809,947, March 24, 1969, Pat. No. 3,598,842, which is a continuation-in-part of Ser. No. 731,271, May 22, 1968, abandoned.

[52] U.S. Cl.............260/621 A, 260/346.2, 260/838
[51] Int. Cl................................................C07l 39/02
[58] Field of Search ......................260/621 A, 621 B

[56] References Cited

UNITED STATES PATENTS 2,931,787  4/1960  Jones et al. .......................260/621 B
1,214,414  1/1917  Berend..............................260/621 B

FOREIGN PATENTS OR APPLICATIONS 3,713,973  9/1962  Japan................................260/621 B Primary Examiner—Howard T. Mars
Attorney—Meyer Neishloss, Deane E. Keith and Richard C. Gaffney

[57] ABSTRACT

A process is defined for the separation of para-cresol from admixture with meta-cresol by the selective condensation of meta-cresol with isobutyraldehyde using a catalyst comprising an aqueous solution of a hydrogen halide.

6 Claims, No Drawings

SEPARATION OF META AND PARA-CRESOL

This application is a divisional application of my copending Ser. No. 809,947, filed March 24, 1969 now U.S. Pat. No. 3,598,842, which is in turn a continuation-in-part application of my Ser. No. 731,271, filed May 22, 1968 and now abandoned, both serial numbers being assigned to the same assignee as the present application.

This invention relates to a process for the separation of para-cresol from admixture with meta-cresol by selective condensation of the meta-cresol using isobutyraldehyde and an aqueous hydrogen halide catalyst.

The reaction of aldehydes, such as formaldehyde, with phenol and other phenolic compounds to form phenolic resins is well known in the art. It has now been found that certain aldehydes, such as isobutyraldehyde, are unique in their reaction with certain phenolic compounds having a hydrogen atom directly attached to the ring carbon atom adjacent the phenolic hydroxyl group to form cyclic ethers.

In accordance with the invention, it has been found that meta and para-cresol can be effectively separated from admixture with each other by the selective condensation of meta-cresol with isobutyraldehyde in the contact presence of an aqueous solution of a hydrogen halide catalyst under condensation conditions.

It has been found that meta-cresol will selectively condense with isobutyraldehyde in the presence of para-cresol so long as the catalyst employed is an aqueous solution of a hydrogen halide. By a "hydrogen halide" is meant HF, HCl, HBr or HI. The preferred hydrogen halide is HCl.

The amount of the acid catalyst to employ in the subject reaction, based on the anhydrous hydrogen halide, is generally quite small, being on the order of 0.1 percent by weight to 10 percent by weight of the meta-cresol with preferred concentrations of the acid (based on anhydrous hydrogen halide) being between 0.3 and 7.0 percent by weight of the meta-cresol. It is preferred to employ the aqueous hydrogen halide catalysts in as high a concentration of the hydrogen halide component as possible in order to minimize the water content in the reaction zone. When hydrochloric acid is employed, for example, the commercial 37 percent solution is satisfactory.

The molar ratio of the isobutyraldehyde to the phenolic reactant (meta-cresol) can suitably be from 0.8:1 to 2.2:1. The preferred molar ratios are from 1.8:1 to 2.2:1.

An inert solvent can be used to aid in contacting the reactants, to maintain any resin formed (some by-product phenolic resin can form) in solution, to aid in maintaining the reaction temperature and to aid in the removal of the water of reaction if desired. The preferred solvents are the organic solvents, toluene and xylene. It is preferred that the solvent be such that the reactants are maintained in a homogeneous phase.

The reaction temperature can suitably be from 80° to 200° C. The preferred reaction temperatures are from 90° to 150° C. Temperatures lower than 80° C. are not suitable since the reaction rate is undesirably slow. Temperatures above 200° C. are undesirable since they tend to promote larger amounts of the resinous by-product.

The reaction pressure is not critical and can suitably be from atmospheric or below to 1,000 psig or higher. Atmospheric pressure is, of course, preferred for economic reasons. The pressure should be sufficient to maintain the aldehyde and cresol reactants in the liquid phase.

The reaction time is not critical. Suitable reaction times can be as low as several minutes to 20 hours or more. Preferred reaction times are between 0.5 and 10 hours, with the most preferred reaction times between 2 and 8 hours. The reaction time is, of course, a function of the reaction temperature, catalyst, catalyst concentration and reactivity of the aldehyde and phenolic charge stocks. Anyone with ordinary skill in the art can determine from a few simple experiments an optimum reaction time for the particular set of conditions, type of reactants and catalysts he employs.

There is nothing critical about the manner of contacting the reactants. The aldehyde and the mixture of meta and para-cresol can suitably be added separately or together to a reaction vessel and the acid catalyst and solvent, if employed, added before, after or during the addition of the reactants. Preferably, the acid catalyst is added to a mixture of the aldehyde-phenolic reactants containing a solvent, if employed. The reaction mixture can then be heated to the desired reaction temperature by any suitable means. The reactants can also, of course, be preheated separately or together before entering the reaction zone, this latter method being more suitable to a continuous type of operation. After a suitable reaction time the by-products are recovered by any suitable means such as by distillation or by caustic washing followed by distillation.

The invention will be further described with reference to the following experimental work.

A series of runs was made to recover substantially pure para-cresol from admixture with meta-cresol by selective condensation of the meta-cresol with isobutyraldehyde using an aqueous solution of HCl (37 percent) as the catalyst. The molar ratio of the isobutyraldehyde to the meta-cresol varied from 0.8:1 to 2:1. The results of these runs (Examples 1–5) are given in the table below.

Referring to the table, it can be seen that the meta-cresol selectively condenses with the isobutyraldehyde, especially as the molar ratio of the aldehyde to meta-cresol approaches 2:1. In Example 4, where the molar ratio of isobutyraldehyde to meta-cresol was 2:1, the purity of the para-cresol recovered was 100 percent.

EXAMPLE 6

In the run for this example, 216 grams (2 moles) of a mixture of meta and para-cresol, containing 50 weight percent meta-cresol, was reacted with two moles of isobutyraldehyde at a temperature between 95° and 98° C. for 5 hours using 1.5 percent by weight of the cresol of sulfuric acid having an $H_2SO_4$ content of 98 percent. Water was not removed during the reaction. The conversion of the cresols was 65 percent, and the yield and efficiency to the formation of a mixture of 2,2,6-trimethyl coumaran and 2,2,5-trimethyl coumaran was 49.5 and 76 percent respectively. The recovered unreacted cresols contained 26.8 percent by weight meta-cresol. 69.2 grams of a resinous byproduct having a molecular weight of 565 was obtained. This run is summarized on the table below.

A comparison of Examples 5 and 6 shows that HCl is unique in its ability to selectively condense the meta-cresol with the isobutyraldehyde. In Example 6, the molar ratio of isobutyraldehyde to meta-cresol was 2:1 but the recovered cresols contained 26.8 percent meta and only 73.2 percent para-cresol compared to 100 percent para-cresol using HCl (Example 5). The poor results of Example 6 were obtained because sulfuric acid was used as the catalyst rather than an aqueous hydrogen halide.

TABLE

| Example No. | 1 | 2 | 3 | 4 | 5 | 6 |
|---|---|---|---|---|---|---|
| Charge Stock Phenol | mixture of m and p-cresol | | | | | |
| % m-cresol | 60 | 60 | 60 | 60 | 50 | 50 |
| Total Grams | 180 | 180 | 180 | 900 | 216 | 216 |
| Total Moles | 1.67 | 1.67 | 1.67 | 8.35 | 2 | 2 |
| Aldehyde | Isobutyraldehyde | | | | | |
| Mole Ratio, Aldehyde to m-cresol | 0.8:1 | 0.9:1 | 1:1 | 1.2:1 | 2:1 | 2:1 |
| Reaction Conditions Temperature, °C | 98–107 | 94–120 | 97–104 | 100–113 | 89–103 | 95–98 |
| Time, Hours | 3 | 3 | 5 | 5 | 3 | 5 |
| Pressure | Atmospheric | | | | | |
| Catalyst[1] | | | | | | |
| Wt.% Anhydrous HCl[2] | 0.73 | 0.73 | 2.2 | 0.8 | 2 | |
| Wt.% Sulfuric Acid (98% $H_2SO_4$) | | | | | | 1.5 |
| Results | | | | | | |
| Wt.% Conversion of Cresols | 61.5 | 68.5 | 66.7 | 69 | 69 | 65 |
| Yield of Coumaran | 14 | 25.4 | 15.1 | 11.7 | 8.5 | 49.5 |
| Efficiency to Coumarans | 22.8 | 37.2 | 22.6 | 17.3 | 12.3 | 76 |
| Resin Wt., Grams | 126.6 | 133.9 | 165.1 | 936.8 | 251 | 69.2 |
| Molecular Weight | 360 | 390 | 415 | 440 | 525 | 565 |
| m-Cresol Recovered Based on % Charged | 23.2 | 17.3 | 12.3 | 8.9 | 0 | |
| p-Cresol Recovered Based on % Charged | 54.2 | 52.1 | 54.3 | 44.4 | 62.6 | |
| Purity of p-Cresol Recovered | 60.8 | 66.7 | 74.6 | 76.9 | 100 | 73.2 |

[1] Based on total mixture of m and p-cresol
[2] Added as a 37% aqueous solution

EXAMPLE 7

Example 4 was repeated except formaldehyde was used in place of isobutyraldehyde, the reaction time was increased to 5 hours, and 1.5 percent by weight of the cresols of anhydrous HCl added as a 37 percent aqueous HCl solution was employed as the catalyst. Substantially all of the meta and para-cresol reacted to form resin, for only 0.9 percent by weight para-cresol was recovered. 252.7 grams of resin were recovered.

EXAMPLE 8

Example 7 was repeated except n-butyraldehyde was used in place of the formaldehyde. Substantially the same results were obtained.

A comparison of Examples 4, 7 and 8 shows the importance of employing an aldehyde as defined herein for the successful recovery of a substantially pure para-cresol from admixture with meta-cresol.

Resort may be had to such variations and modifications as fall within the spirit of the invention and the scope of the appended claims.

I claim:

1. A process for the selective condensation of meta-cresol from an admixture consisting essentially of meta-cresol and para-cresol which comprises contacting said admixture with isobutyraldehyde at a temperature from 80° to 200° C in the contact presence of an aqueous solution of a hydrogen halide catalyst.

2. A process according to claim 1 wherein the hydrogen halide is hydrogen chloride.

3. A process according to claim 1 wherein the molar ratio of the isobutyraldehyde to the meta-cresol is from 1.8:1 to 2.2:1.

4. A process which comprises contacting a mixture consisting essentially of meta- and para-cresol with isobutyraldehyde in the contact presence of an aqueous solution of a hydrogen halide catalyst at a temperature from 80° to 200° C and wherein the molar ratio of the halide to the meta-cresol is from about 1.8:1 to 2.2:1 and thereafter recovering a substantially pure para-cresol.

5. A process according to claim 4 wherein the hydrogen halide is hydrogen chloride.

6. A process according to claim 5 wherein the aqueous hydrogen halide contains about 37 weight percent HCl.

* * * * *